US006296221B1

(12) United States Patent
Nadeau (10) Patent No.: US 6,296,221 B1
(45) Date of Patent: Oct. 2, 2001

(54) UNIVERSAL SEAT SUSPENSION SYSTEM (76) Inventor: Jacques Nadeau, 420 Blvd. Mgr. Pichette, Edmundston, New Brunswick (CA), E3V 3Y7

(*) Notice: Subject to any disclaimer, the term of this patent is extended or adjusted under 35 U.S.C. 154(b) by 0 days.

(21) Appl. No.: 09/257,890

(22) Filed: Feb. 25, 1999

(30) Foreign Application Priority Data

Nov. 5, 1998 (CA) .................................................. 2253114

(51) Int. Cl.⁷ .................................................. F16M 13/00
(52) U.S. Cl. .......................................... 248/631; 297/308
(58) Field of Search .................................. 248/631, 585, 248/421, 564, 566, 576, 573; 297/308, 331, 344.16

(56) References Cited

U.S. PATENT DOCUMENTS

| 2,043,287 | 6/1936 | Dorton ................................... 155/82 |
| 2,466,345 | 4/1949 | Wyeth ..................................... 296/63 |
| 2,685,913 | 8/1954 | Schlueter ................................ 155/51 |
| 3,139,304 | * 6/1964 | Lehner et al. .......................... 297/303 |
| 3,268,200 | * 8/1966 | Eicher ..................................... 248/564 |
| 3,545,810 | 12/1970 | Anderson et al. .................... 297/373 |
| 3,572,828 | * 3/1971 | Lehner ................................... 297/308 |
| 3,583,518 | 6/1971 | Bichel et al. ............................ 180/89 |
| 3,601,351 | * 8/1971 | Ambrosius ............................ 248/566 |
| 3,827,747 | 8/1974 | Cookes ............................... 296/65 R |
| 3,841,696 | 10/1974 | Wagner ............................... 296/65 R |
| 3,861,637 | * 1/1975 | DeLongchamp ..................... 248/576 |
| 4,005,845 | 2/1977 | Luppi et al. .......................... 248/419 |
| 4,025,108 | 5/1977 | Leighty et al. ....................... 297/335 |
| 4,026,601 | 5/1977 | Dill, III et al. ........................ 297/345 |
| 4,047,759 | 9/1977 | Koscinski et al. .................... 297/346 |
| 4,076,302 | 2/1978 | Soble ................................. 296/65 R |
| 4,168,050 | 9/1979 | Nerem et al. ......................... 248/393 |
| 4,262,958 | 4/1981 | Houseman et al. ................ 296/65 R |
| 4,311,205 | 1/1982 | Goodacre et al. .................. 180/68.5 |
| 4,312,418 | 1/1982 | Rittman et al. ..................... 180/68.5 |
| 4,359,121 | 11/1982 | Messner et al. .................... 180/69 R |
| 4,364,602 | 12/1982 | Rigazio ................................ 297/334 |
| 4,429,761 | 2/1984 | Haddock et al. .................... 180/271 |
| 4,533,110 | * 8/1985 | Hill ....................................... 248/573 |
| 4,565,407 | 1/1986 | Brautigam ............................ 297/335 |
| 4,648,655 | * 3/1987 | Moorhouse .......................... 297/331 |
| 4,678,155 | * 7/1987 | Carter .................................. 248/564 |
| 4,696,508 | 9/1987 | Brautigam ......................... 296/65 R |
| 4,884,843 | 12/1989 | DeRees ................................ 297/331 |
| 4,930,593 | 6/1990 | Swartzendruber ................ 180/89.17 |
| 5,004,206 | * 4/1991 | Anderson ............................ 248/585 |
| 5,037,155 | 8/1991 | Holm et al. ......................... 296/65.1 |
| 5,303,792 | 4/1994 | Shimizu ............................. 180/89.17 |
| 5,524,721 | 6/1996 | Yamauchi ............................. 180/69.2 |

(List continued on next page.)

FOREIGN PATENT DOCUMENTS

| 1237971 | 6/1988 | (CA). |
| 1242134 | 9/1988 | (CA). |
| 2015353 | 6/1991 | (CA). |
| 1202632 | 8/1970 | (GB). |

Primary Examiner—Anita King
(74) Attorney, Agent, or Firm—Mario Theriault (57) ABSTRACT A seat suspension system having a seat cradle, a seat mounted in the seat cradle and an anchor body having a plain rectangular box-like shape disposed behind the backrest portion of the seat. A pair of spaced-apart plain parallel anchor plates encloses the anchor body. There are also provided two pairs of spaced-apart parallel bars each having spaced-apart first and second ends, the first ends being movably connected to the anchor body and the second ends being movable connected to the seat cradle for allowing a movement of the seat cradle relative to the anchor body. An air bellows is mounted inside the anchor body. The air bellows has an upper end connected to the seat cradle and a lower end connected to the anchor body. A variety of attachment kits may be affixed to the anchor plates for mounting the seat suspension system to different models of industrial vehicles.

19 Claims, 9 Drawing Sheets

U.S. PATENT DOCUMENTS

| | | | |
|---|---|---|---|
| 5,524,722 | 6/1996 | Bowman et al. | 180/89.17 |
| 5,636,884 | 6/1997 | Ladetto et al. | 296/65.1 |
| 5,651,585 * | 7/1997 | Van Duser | 297/344.16 |
| 5,720,462 | 2/1998 | Brodersen | 248/425 |
| 5,733,006 | 3/1998 | Woods | 297/344.22 |
| 5,797,574 | 8/1998 | Brooks et al. | 248/398 |
| 5,853,221 | 12/1998 | Thomson et al. | 297/344.24 |

* cited by examiner

UNIVERSAL SEAT SUSPENSION SYSTEM

FIELD OF THE INVENTION

The present invention relates to seat suspension system for industrial vehicles, and more particularly it relates to an air suspension system for a removable seat, that is adaptable to different models of lift trucks.

BACKGROUND OF THE INVENTION

The engine of a lift truck is typically located under the seat of the vehicle, and the seat needs to be removed for servicing the engine. Lift trucks have a compact structure that is adapted to travelling in narrow aisles of packed warehouses or to maneuvering in and out of rail box cars for examples. For this reason, driver seats in these lift trucks are generally as simple as possible and are often designed for removability rather than for comfort.

Because of the physical constrictions in these industrial vehicles, it has been a challenge in the past to design a seat suspension system that offers comfort to the driver as well as an easy access to the engine compartment of the vehicle. In that respect, it is known that a number of removable vehicle seats have been developed in the past and have been used with varying degrees of success. Examples of seats and seat adjustment mechanisms for industrial vehicles are illustrated and described in the following patent documents.

U.S. Pat. No. 2,043,287 issued on Jun. 9, 1936 to John M. Dorton;
U.S. Pat. No. 2,466,345 issued on Apr. 5, 1949 to Nathaniel Wyeth;
U.S. Pat. No. 2,685,913 issued on Aug. 10, 1954 to Brune G. Schlueter;
U.S. Pat. No. 3,545,810 issued on Dec. 8, 1970 to Ralph F. Anderson et al.;
U.S. Pat. No. 3,583,518 issued on Jun. 8, 1971 to Darwin Carl Bichel et al.;
U.S. Pat. No. 3,827,747 issued on Aug. 6, 1974 to Austin C. Cookes;
U.S. Pat. No. 3,841,696 issued on Oct. 15, 1974 to Robert T. Wagner;
U.S. Pat. No. 4,005,845 issued on Feb. 1, 1977 to Carlos E. Luppi et al.;
U.S. Pat. No. 4,025,108 issued on May 24, 1977 to Conard E. Leighty et al.;
U.S. Pat. No. 4,026,601 issued on May 31, 1977 to John L. Dill, III et al.;
U.S. Pat. No. 4,047,759 issued on Sep. 13, 1977 to D. P. Koscinski;
U.S. Pat. No. 4,076,302 issued on Feb. 28, 1978 to Frank R. Sable;
U.S. Pat. No. 4,168,050 issued on Sep. 18, 1979 to Marvin E. Nerem et al.;
U.S. Pat. No. 4,262,958 issued on Apr. 21, 1981 to Henry J. Houseman et al.;
U.S. Pat. No. 4,311,205 issued on Jan. 19, 1982 to Ronald Goodacre et al.;
U.S. Pat. No. 4,312,418 issued on Jan. 26, 1982 to Udo Rittman;
U.S. Pat. No. 4,359,121 issued on Nov. 16, 1982 to John S. Messner et al.;
U.S. Pat. No. 4,364,602 issued on Dec. 21, 1982 to Corrado Rigazio;
U.S. Pat. No. 4,429,761 issued on Feb. 7, 1984 to Louis A. Haddock, Jr. et al.;
U.S. Pat. No. 4,565,407 issued on Jan. 21, 1986 to Peter F. Brautigam;
U.S. Pat. No. 4,696,508 issued on Sep. 29, 1987 to Peter F. Brautigam;
U.S. Pat. No. 4,884,843 issued on Dec. 5, 1989 to Delbert D. DeRees;
U.S. Pat. No. 4,930,593 issued on Jun. 5, 1990 to James A. Swartzendruber et al.;
U.S. Pat. No. 5,037,155 issued on Aug. 6, 1991 to David R. Holm et al.;
U.S. Pat. No. 5,303,792 issued on Apr. 19, 1994 to Yutaka Shimizu;
U.S. Pat. No. 5,524,721 issued on Jun. 11, 1996 to Yoshihiko Yamauchi;
U.S. Pat. No. 5,524,722 issued on Jun. 11, 1996 to Robert L. Bowman;
U.S. Pat. No. 5,636,884 issued on Jun. 10, 1997 to Brett G. Ladetto et al.;
U.S. Pat. No. 5,720,462 issued on Feb. 24, 1998 to Cole T. Brodersen;
U.S. Pat. No. 5,733,006 issued on Mar. 31, 1998 to Perry W. Woods;
U.S. Pat. No. 5,797,574 issued on Aug. 25, 1998 to Stephen R. Brooks et al.;
U.S. Pat. No. 5,853,221 issued on Dec. 29, 1998 to D.C. Thoman et al.;
CA 1,237,971 issued on Jun. 14, 1988 to Frank W. Grigg;
CA 1,242,134 issued on Sep. 20, 1988 to Roy M. Bailey;
CA 2,015,353 published on Jun. 4, 1991 by Dennis J. Gryp;
GB 1,202,632 issued on Aug. 19, 1970 to Georg Grammar;

It is believed that the seats and seat suspension mechanisms described in the prior art documents were designed for specific applications or for specific makes of vehicles and are hardly adaptable to different models of lift trucks.

A warehousing operation or a shipping and receiving department often comprises a number of lift trucks that were purchased at different times and from different suppliers, and therefore, very little standardization can be found in the industry with regard to lift truck makes and models operated by a same company. Because of the uniqueness of each lift truck design, it has been difficult in the past for seat manufacturers to develop a standard model of seat suspension system that would be marketable to the industry in general, and that would be appropriate for easy installation on most models of lift trucks. It is this reason basically that has contributed to the development of a market demand for a better seat suspension system that is manufacturable as a common unit, and that is compatible to the conformations and limitations of most popular lift trucks.

SUMMARY OF THE INVENTION

In the present invention, however, there is provided an universal seat suspension system that is compact in size, that has few moving parts and that has a plain-shaped anchor body which can be used with various mounting kits for installation into different models of industrial vehicles.

Broadly, in accordance with one feature of the invention, there is provided a seat suspension system comprising a seat cradle, a seat mounted in the seat cradle, and an anchor body having means for attachment to the frame of an industrial vehicle. There are also provided two pairs of spaced-apart parallel bars each having spaced-apart first and second ends, the first ends being movably connected to the anchor body and the second ends being movably connected to the seat cradle for allowing a movement of the seat cradle relative to the anchor body. A single air bellows is mounted inside the anchor body for cushioning the movement of the seat craddle. The air bellows has an upper end connected to the seat cradle and a lower end connected to the anchor body.

The anchor body has a plain rectangular box-like shape disposed behind the backrest portion of the seat, and a pair of spaced-apart plain and parallel anchor plates to which may be mounted a variety of structural connections for retaining the anchor body to the frame of a vehicle.

A primary advantage of the structure of the present invention is that the anchor body is adaptable for use with various mounting kits for securement thereof to a variety of different models of industrial vehicles. The seat suspension system according to the present invention is manufacturable as a standard unit whereby a manufacturer can standardize manufacturing inventories and procedures and manufacture the seat suspension systems at a reasonable price. The mounting of the seat suspension system is effected using attachment kits that are customized to the shape of each model of vehicle.

According to another feature of the present invention, the two pairs of parallel bars comprise an upper pair of parallel bars and a lower pair of parallel bars, and the bars in the upper pair are rigidly connected to one-another by a torsion or stabilization rod for preventing movement of these bars relative to one-another, and for preventing an uneven movement of the seat cradle when the seat cradle is loaded on the edge for example.

In another feature of the present invention, the torsion or stabilization rod is mounted in a pair of bearing blocks. These bearing blocks are in turn mounted on a pair of levers that are pivotally connected to the anchor body. A pair of bolts extending through the anchor body and the levers are usable for adjusting the position of the levers relative to the anchor body. The position of the torsion rod relative to the anchor body and a related levelling of the seat cradle are adjustable by working the pair of bolts.

This feature is particularly appreciable for adjusting the plane of the seat to compensate for an imperfect mounting of an attachment kit for example, or to compensate for work-related wear in the articulations of the seat suspension system.

According to yet another feature of the present invention, there is provided a swivel mechanism mounted between the sitting portion of the seat and the seat cradle. The swivel mechanism comprises rotation limiting means having a range of 60 degrees. The rotation limiting means is a spring-loaded ball-tipped plunger moving against an arcuate template. The template has holes therein at locations corresponding to first, second and third angular positions of the seat, for restrictively retaining the plunger in one of these holes. The tension of the spring in the spring-loaded plunger is calibrated such that an operator using the seat suspension system having the swivel mechanism mounted therein is able to twist the seat sideways to one of the lateral positions when driving the vehicle backward for example, for easing uncomfortable postures related to backward driving.

Still another feature of the invention is that it is susceptible of a low cost of manufacture with regard to materials, equipment and labour, and which accordingly is then susceptible of low price of sale to the industry thereby making such seat suspension system economically available to the public.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE PREFERRED EMBODIMENT

While this invention is susceptible of embodiments in many various forms, there is shown in the drawings and will be described in details herein a specific embodiment, with the understanding that the present disclosure is to be considered as an example of the principles of the invention and is not intended to limit the invention to the embodiment illustrated.

Referring to FIGS. 1–6, the universal seat suspension system according to the preferred embodiment is illustrated therein. The seat suspension system is comprised broadly of an anchor body 30, and a seat cradle 32 movably mounted to the anchor body 30 on a pair of upper parallel bars 34,34' and a pair of lower parallel bars 36,36'. The lower parallel bars 36,36' are pivotally connected to a pair of plain and parallel anchor plates 40,40' enclosing both sides of the anchor body 30. The anchor plates 40,40' are drilled and tapped or otherwise adapted to receiving braces of various shapes and types for securing the anchor body 30 to the frame of a vehicle.

The anchor body 30 has a hollow shape enclosing an air bellows 42. The preferred air bellows 42 has a diameter of about 4.6 inches and a total displacement of about 5 inches. The air bellows has its lower end connected to a shelf plate 44 comprised in the structure of the anchor body 30. The upper end of the air bellows 42 is connected to an inverted shelf plate 46 comprised in the structure of the seat cradle 32. Therefore, a vertical movement of the seat cradle 32 relative to the anchor body 30 is a cushioned movement that is controlled by the air pressure inside the air bellows 42.

The air bellows 42 is preferably a type having an air inlet connection 48 therein whereby the stiffness of the air suspension mechanism is adjustable by varying the air pressure inside the air bellows. The air inlet connection 48 is preferably connected to a DC electric air compressor (not shown) which may be conveniently located under the dashboard of the vehicle. An air pressure control switch (not shown) is also preferably located in the vicinity of the dashboard for controlling the operation of the air compressor. Hence, an operator using the lift truck having the seat suspension system affixed thereto can easily adjust the stiffness of the seat according to his/her own weight, his/her height or to his/her personal preferences.

Figure 1:
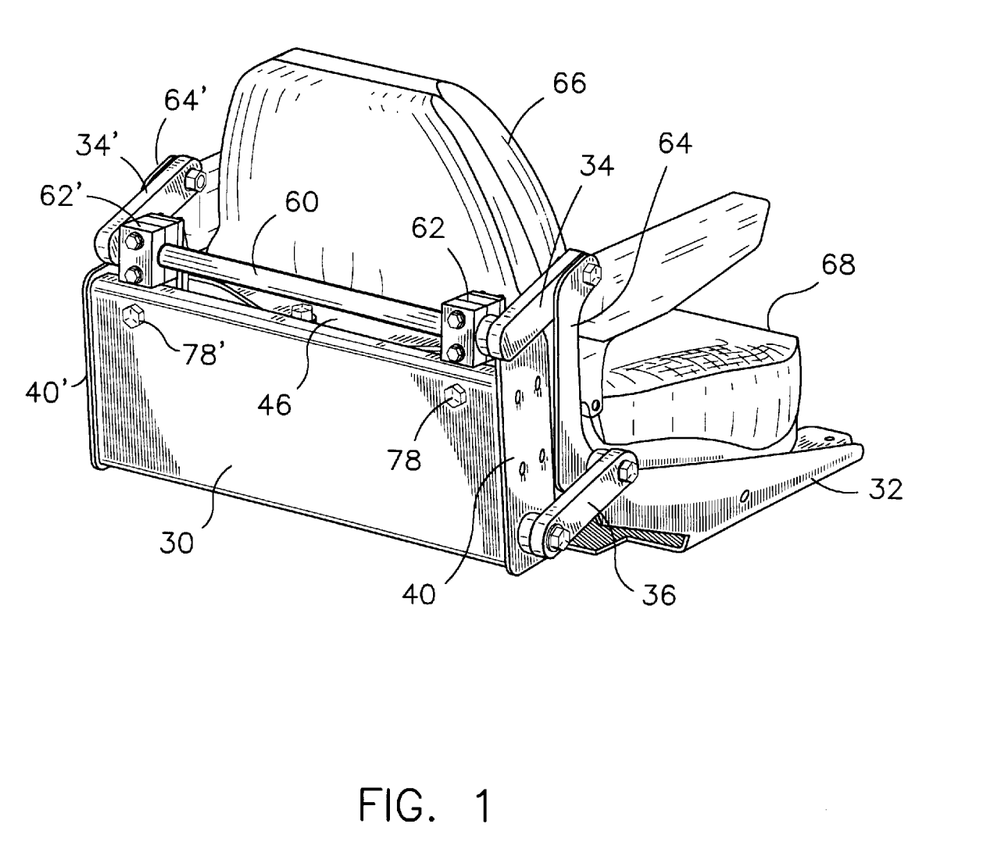
FIG. 1 is a rear and right side perspective view of the seat suspension system according to the preferred embodiment of the present invention.
Figure 2:
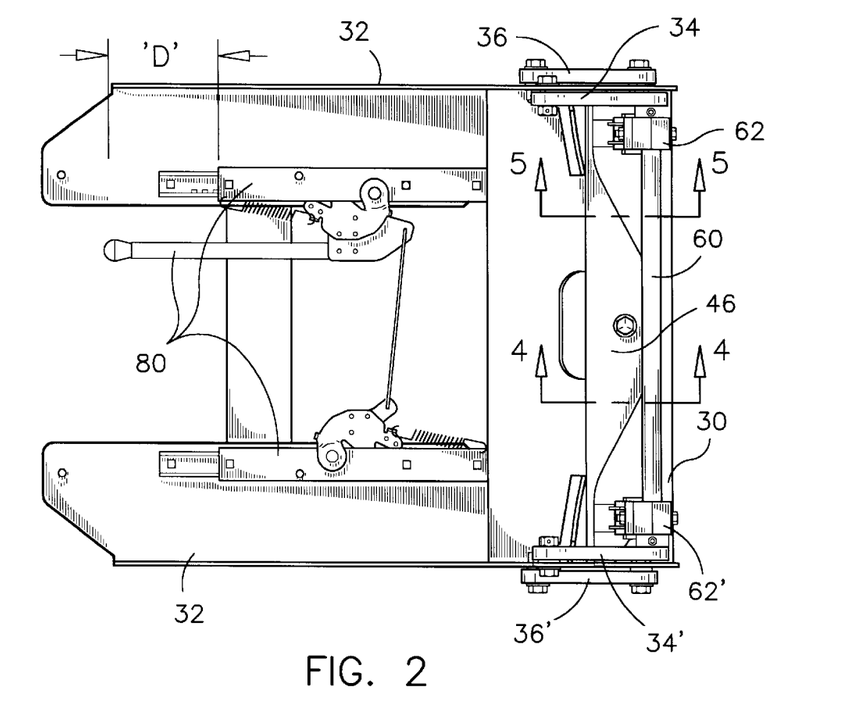
FIG. 2 is a plan view of the seat suspension system shown without the seat.
Figure 3:
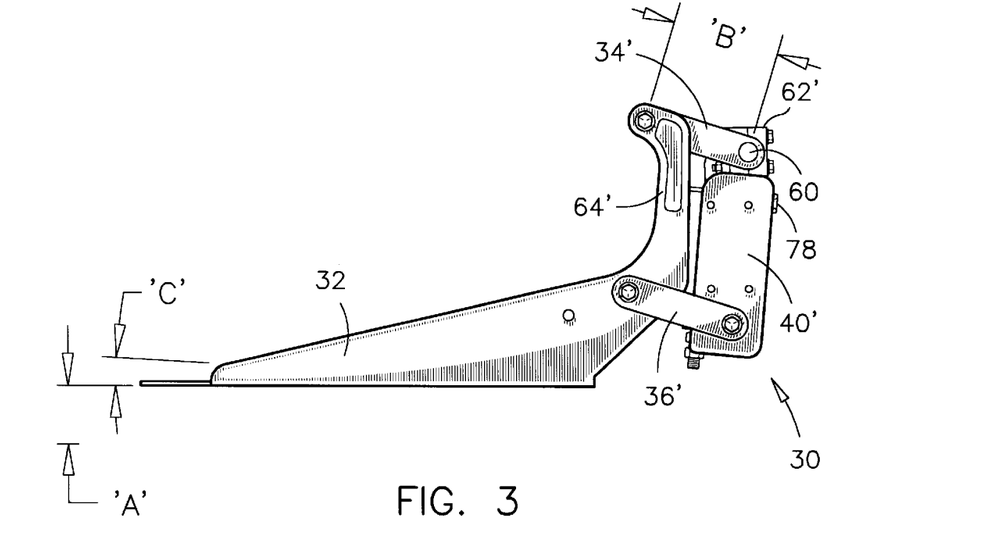
FIG. 3 is a left side elevation view of the seat suspension system shown without the seat.

The lower position of the seat cradle 32 is adjustable by means of a bumper bolt 50 threaded through the shelf plate 44, and a stopper bracket 52 affixed to the backrest frame 54 of the seat cradle 32, in alignment with the bumper bolt 50. In that respect, a preferred maximum vertical travel of the seat cradle 32 relative to the anchor body 30, as shown as dimension label 'A' in FIG. 3 is about 3 inches.

It has been found that when the seat suspension system is used in a lift truck travelling on an uneven floor, the seat is quite comfortable when the seat cradle 32 is set at about one inch from its lower position while supporting an operator.

The lower parallel bars 36,36' are individually pivotally connected to a respective one of the anchor plates 40,40'. The upper parallel bars 34,34' are rigidly connected to a stabilization or torsion rod 60 extending along and above the anchor body 30. The stabilization rod 60 is pivotally mounted in a pair of bearing blocks 62,62', which are in turn connected to the anchor body 30.

The seat cradle 32 has a pair of upwardly extending arm members 64,64' connected to both pairs of parallel bars. The upper ends of the arm members 64,64' are pivotally connected to the upper parallel bars 34,34'. The lower parallel bars 36,36' are respectively pivotally connected to an intermediate region of each arm member 64,64'. The upper parallel bars 34,34' are mounted on the inside of a respective arm member 64,64' such that these bars 34,34' are laterally as close as possible to a backrest 66 of the seat 68, to cause as little elbow obstruction as possible to a driver using the seat suspension system. The lower parallel bars 36,36' are mounted to the outside of the arm members 64,64', such that they provide, in association with the upper parallel bars, 34,34', lateral support to the seat cradle 32.

The presence of a stabilizing torsion rod 60 prevents the seat cradle 32 from twisting or otherwise flexing when loaded unevenly, such as when a person sits on the edge of the seat for example. The presence of the torsion rod 60 ensures that the movement of the seat cradle 32 is even and firm. The preferred size of the torsion rod 60 when the seat suspension system is installed in a lift truck for example, is a solid cold rolled steel rod having a diameter of about ⅞ inch. The effective length 'B' of each parallel bar is about 5 inches. These dimensions and material have been found to be appropriate for preventing a twisting and flexing of the seat cradle 32 under extreme working conditions.

Figures 4, 5:
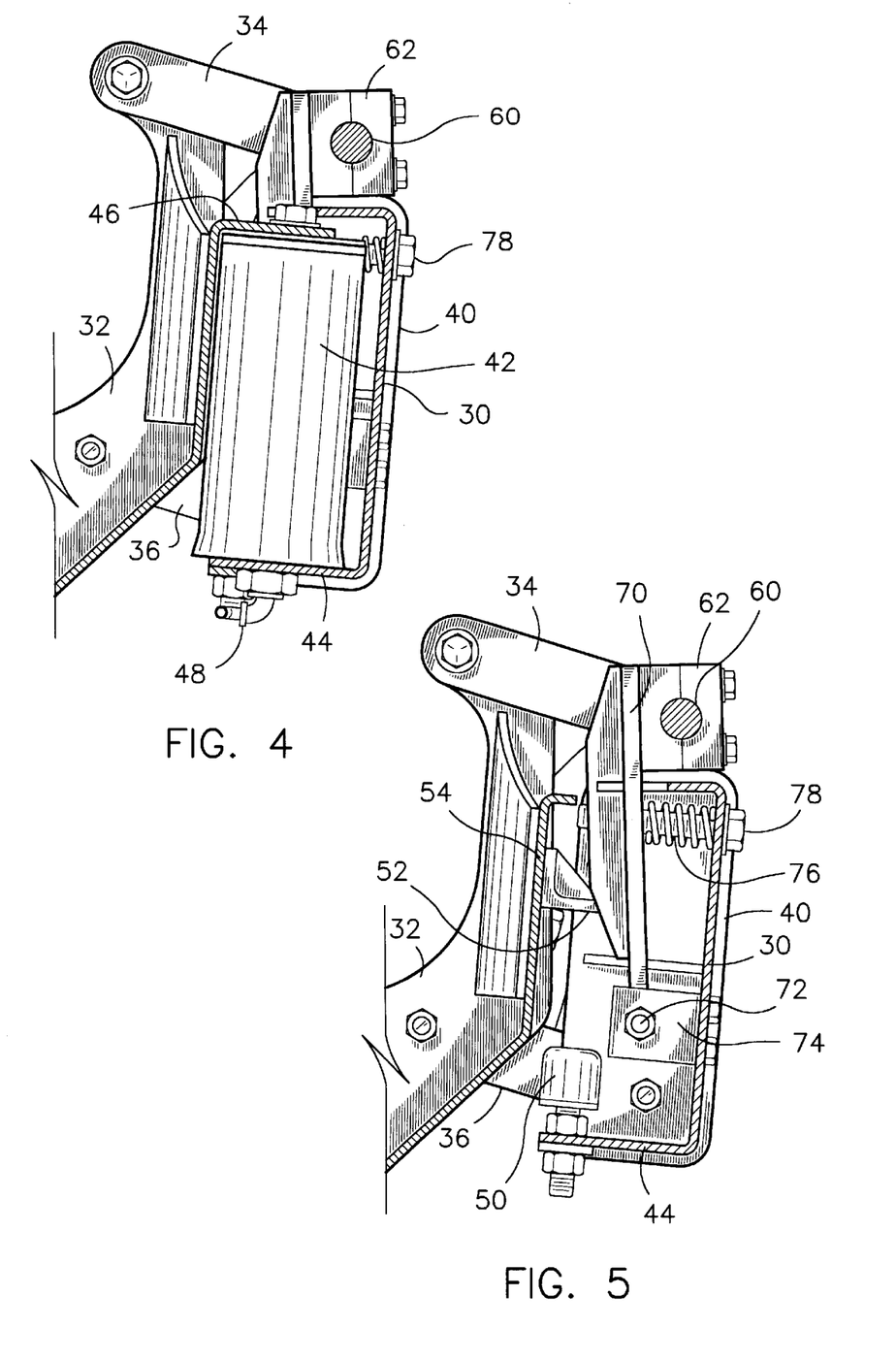
FIG. 4 is a partial cross-section view of the seat suspension system as seen along lin 4—4 in FIG. 2.
FIG. 5 is a partial cross-section view of the seat suspension system as seen along line 5—5 in FIG. 2.

Referring particularly to FIGS. 3 and 5, the bearing blocks 62,62' are mounted on a pair of levers 70 that have their lower ends movably mounted on a respective pivot 72 and clevis 74. Each clevis 74 is affixed to the anchor body 30. The movement of each lever 70 about the pivot 72 is controlled by an adjuster bolt assembly 76 extending through both the anchor body 30 and a respective lever 70. The rotation of a bolt heads 78,78' on the adjuster bolt assemblies 76 causes the levers 70 and the torsion rod 60 to move forward or backward relative to the anchor body 30, about the pivots 72. This movement has the effect of causing the front edge of the seat to move up or down as illustrated by dimension label 'C' in FIG. 3. Therefore, when the mounting of the seat suspension system to the frame of a vehicle is not perfect, the plane of the seat may be easily adjusted by working the bolts 78.

Referring back particularly to FIG. 2, the seat cradle 32 preferably has a slide rail system 80 therein for supporting a seat 68 in such a way that the seat is adjustable forward and backward over a distance of about 6 inches, as illustrated by dimension 'D', to accommodate the preferences of different drivers.

Figures 6, 7, 8:
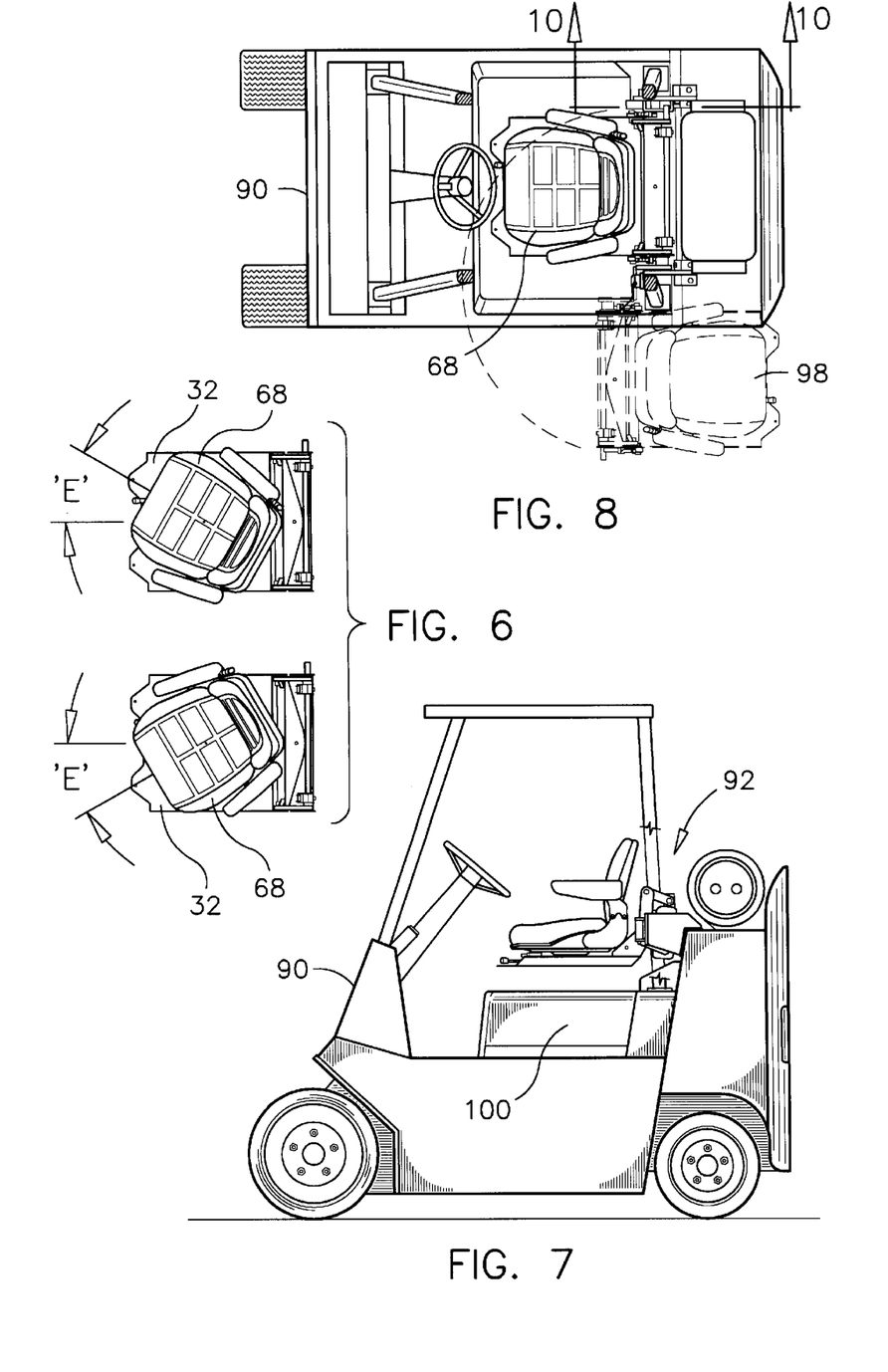
FIG. 6 illustrates the seat suspension system with a seat mounted thereon and adjusted in two different positions.
FIG. 7 illustrates a left side elevation view of the seat suspension system mounted on a first lift truck.
FIG. 8 is a plan view of the first lift truck having the seat suspension system according to the preferred embodiment mounted on swing-out attachment kit.
Figure 9:
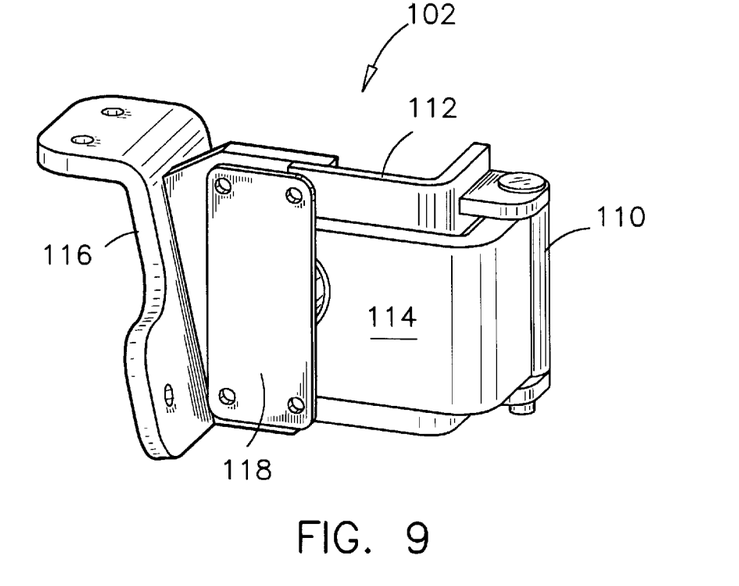
FIG. 9 is a perspective view of a hinge bracket comprised in the swing-out attachment kit.
Figure 17:
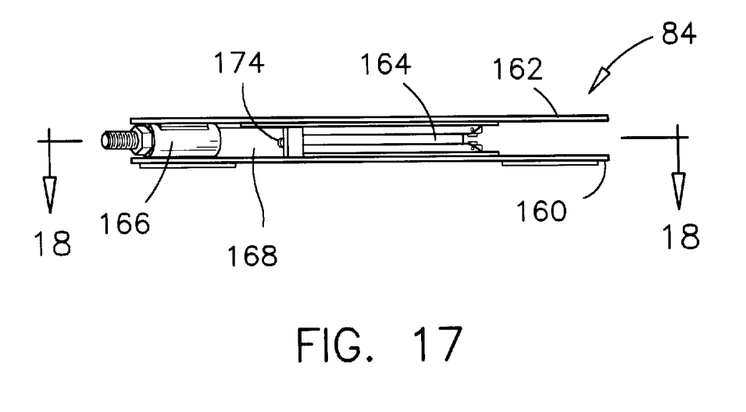
FIG. 17 illustrates a front view of the swivel mechanism optionally incorporated under the seat of the seat suspension system.
Figure 18:
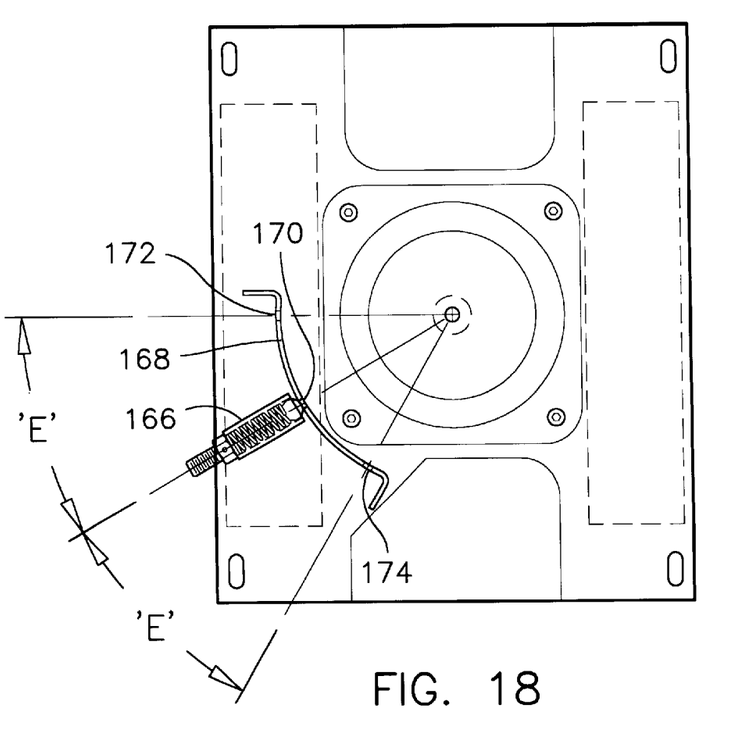
FIG. 18 is a plan cross-section view of the swivel mechanism as seen along line 18—18 in FIG. 17.

The seat cradle 32 also preferably has a swivel mechanism 84, as illustrated in FIGS. 17 and 18, mounted on the slide rail system 80, for allowing the seat to rotate side to side over an angular displacement of about 30 degrees each side, as illustrated by dimension labels 'E' in FIG. 6.

Lift trucks are often driven backward. Therefore, the swiveling of the seat as described herein above is particularly appreciated by lift truck operators for reducing the back and neck strains associated with the twisting of ones body for looking backward.

As can be appreciated, the seat suspension system according to the preferred embodiment has few moving parts, a low and narrow profile, lateral stiffening means, seat levelling means, and a sturdy structure that requires but a single air bellows for proper operation. Furthermore, the anchor body 30 is a plain rectangular box-like member that is mounted adjacent the backrest 66 of a vehicle seat and that has a pair of spaced-apart parallel anchor plates 40,40' to which can be affixed a variety of attachment kits. The plain box-like rectangular shape and compact arrangement of the anchor body 30 are major features of the present invention for allowing the seat suspension system to be installed without modifications into a variety of different lift trucks and other industrial vehicles.

A first preferred attachment kit for mounting the seat suspension system to a lift truck 90 is hereinafter referred to a swing-out attachment kit 92. The operation of the swing-out attachment kit 92 is illustrated in FIG. 7. The attachment kit allows the seat 68 to be swung out of the cab of the lift truck 90, over an angular distance of 180 degrees, as illustrated by the dashed-line position 98 in FIG. 8, in order to allow access to the engine compartment 100 of the vehicle.

Referring now to FIGS. 9–12, the swing-out attachment kit comprises a hinge bracket 102, a latch bracket 104 and a latch member 106. The hinge bracket 102 comprises a hinge 110 joining a fixed brace 112 and a movable brace 114. The fixed brace 112 is connected to a base plate 116 having dimensions and characteristics for attachment to the frame of a lift truck 90. The movable brace 114 has a first mate plate 118 mounted thereon. The first mate plate 118 has dimensions and characteristics for attachment to one of the anchor plates 40' of the seat suspension system. When the anchor body 30 is connected to the hinge bracket 102, and when the hinge bracket is mounted to the frame of a lift truck for example, the seat suspension system may be swung out of the cab of the lift truck about the axis of the hinge 110, as illustrated in FIG. 8.

The latch member 106 has a second mate plate 120, which also has dimensions and characteristics for attachment to another one of the anchor plates 40 of the seat suspension system. The second mate plate 120 has a pair of stub shafts 122 extending therefrom and away from the anchor plate 40. The stub shafts 122 have dimensions and placement for engagement into a pair of sockets 124 in the latch bracket 104. The latch bracket 104 also has a base plate 126 for attachment to the frame of a lift truck.

Both stub shafts 122 are made of cold rolled steel and have a diameter of ⅞ inch. The preferred vertical spacing 'F' between both stub shafts 122 and the sockets 124 is at least about 5 inches, such that a twisting moment on the hinge 110 is practically non-existent when the seat is being used and the stub shafts 122 are properly engaged into a respective socket 124.

Figure 10:
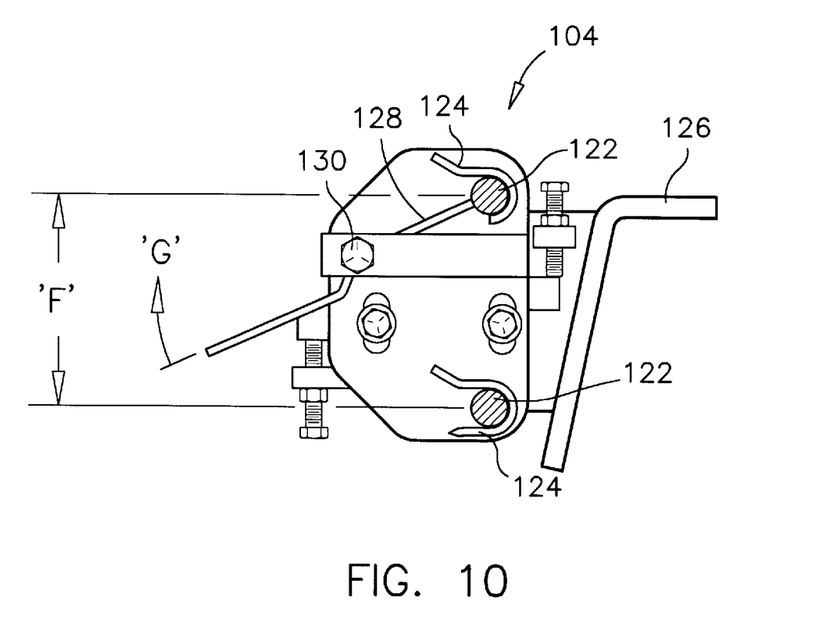
FIG. 10 is a cross-section view, as seen along line 10—10 in FIG. 8, of a latch bracket usable in association with the hinge bracket illustrated in FIG. 9 for supporting the seat suspension system in a swing-out mode.
Figure 11:
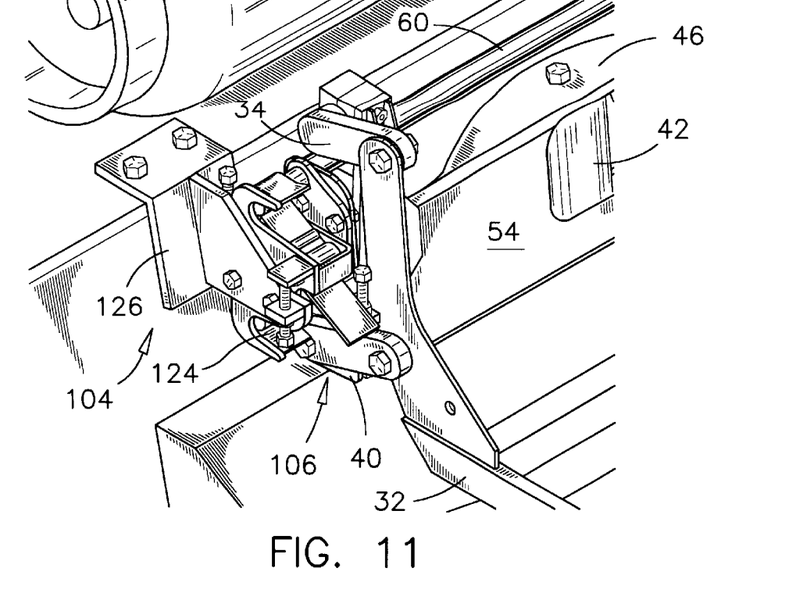
FIG. 11 is a first front and right side perspective view of the latch member and latch bracket comprised in the swing-out attachment kit, shown in a latched position.
Figure 12:
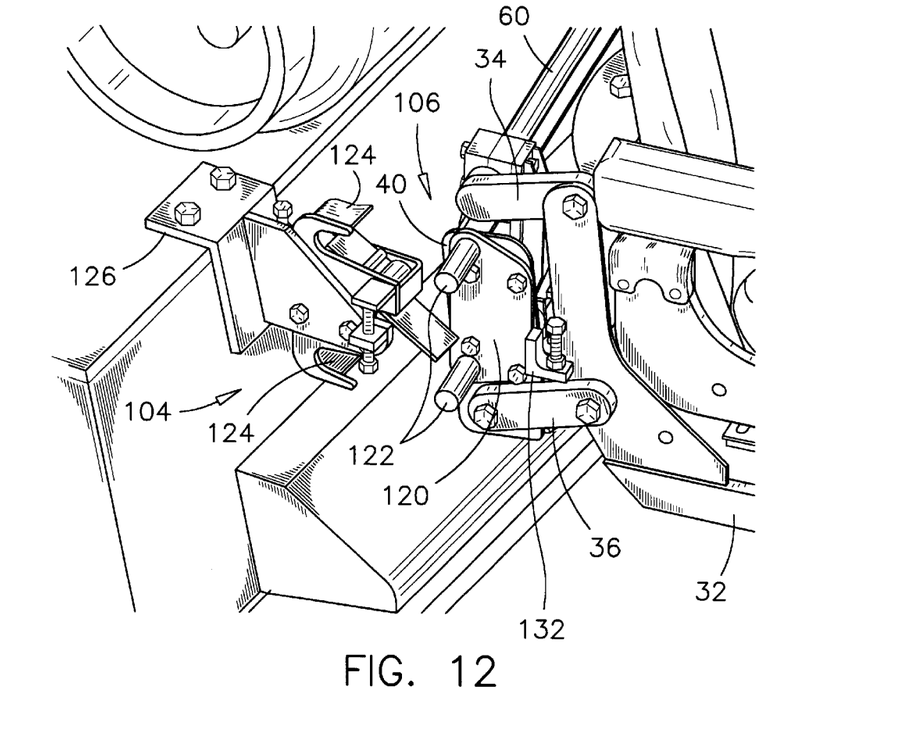
FIG. 12 is a second front and right side perspective view of the latch member and latch bracket comprised in the swing-out attachment kit, illustrated in a disengaged position.

The upper stub shaft 122 is retainable inside the upper socket 124 by a latch blade 128. The latch blade 128 is pivoted about a bolt 130 for an angular movement about the bolt 130. The latch blade 128 is preferably spring actuated (not shown) for alignment with the socket 124 and for preventing the upper stub shaft 122 from moving out of the socket when the seat suspension system is in a usable mode. In use, the forward portion of the blade 128 is lifted upwardly as shown at 'G' for releasing the upper stub shaft 122 and for allowing the seat suspension system to swing out of the cab of the lift truck.

As also illustrated in FIGS. 11 and 12, a stopper mechanism 132 may also be incorporated on one or both mate plates 118,120, or on one or both anchor plates 40,40' for limiting an upward movement of the lower parallel bars 36,36' and of the seat cradle 32.

Figure 13:
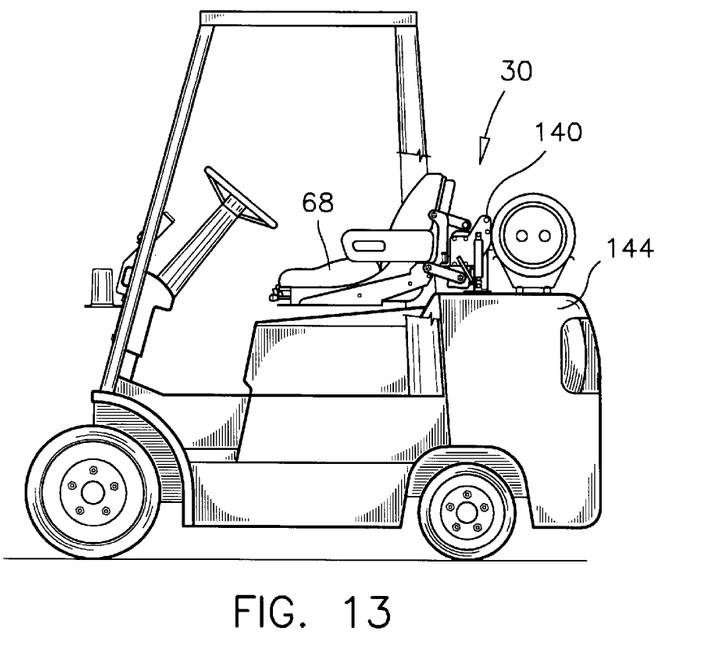
FIG. 13 is a left side elevation view of a second lift truck having the seat suspension system according to the preferred embodiment mounted on a tilt-up attachment kit, and showing the seat in a usable position.
Figure 14:
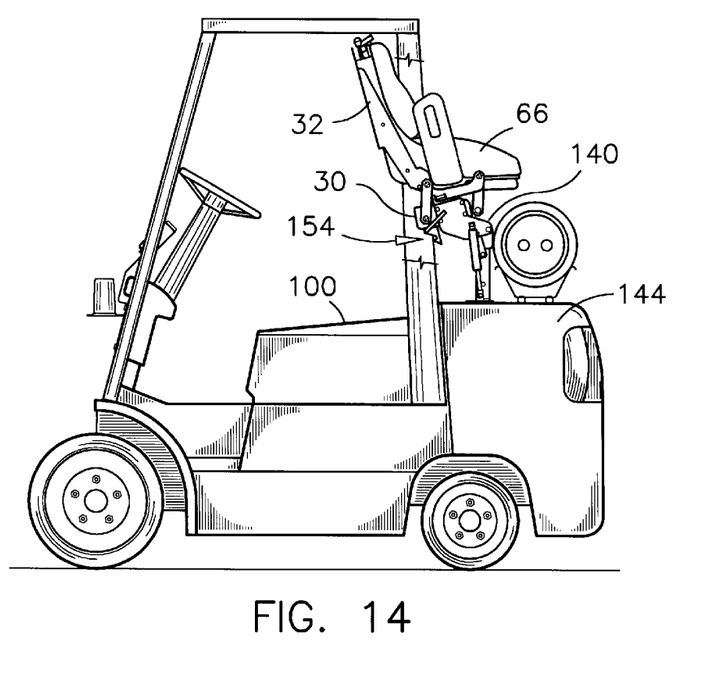
FIG. 14 is a left side elevation view of the second lift truck having the seat suspension system according to the preferred embodiment supported on a tilt-up attachment kit, and illustrating the seat in a raised position.
Figure 15:
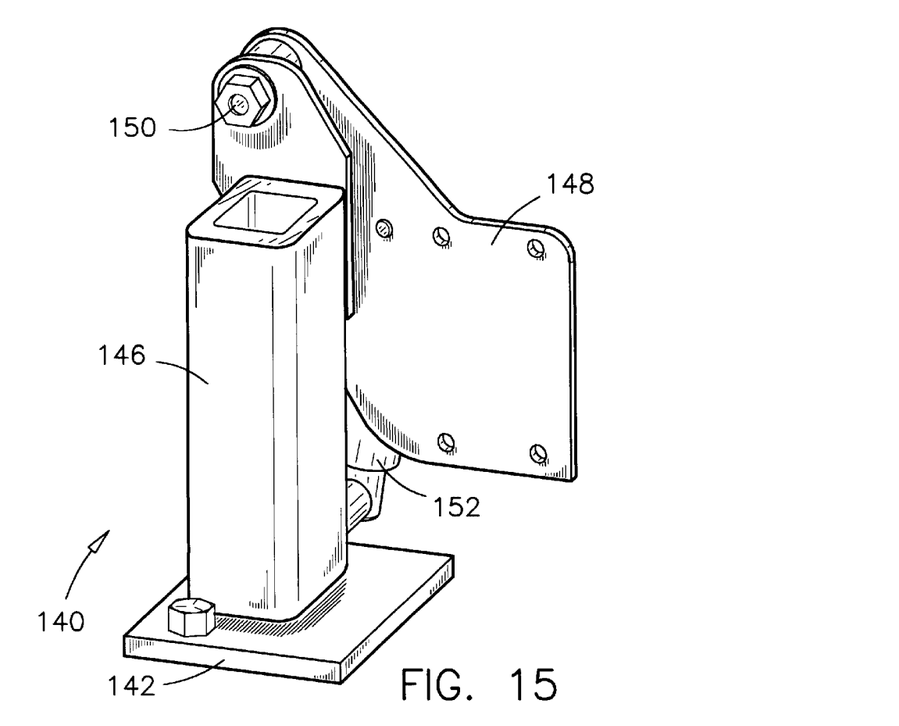
FIG. 15 is a first type of anchor bracket comprised in a tilt-up attachment kit for supporting the seat suspension system.

Referring now to FIGS. 13 and 14, the seat suspension system according to the preferred embodiment is illustrated therein with a tilt-up mounting kit. In some models of lift trucks, it is preferable to move the seat upwardly as opposed to sideways as previously illustrated, for accessing the engine compartment 100. In these cases, the anchor body 30 is connected to a pair of tilt-up post assemblies 140 such as the left hand version of such post shown in FIG. 15. Each post assembly 140 has a base member 142 which has dimensions and shape for mounting to the weight 144 of a lift truck. This post assembly 140 has an upright member 146, a mate plate 148 which has dimensions and properties for mounting to one of the anchor plates 40'. A pivot bolt 150 joins the mate plate 148 to the upright member 146. There is also provided on each tilt-up post assembly 140, an air spring 152 for assisting in the raising of the seat suspension system. A latch mechanism such as partly illustrated at 154 in FIG. 14, may also be incorporated in the post assembly 140 for locking the seat suspension system in the lower position.

Figure 16:
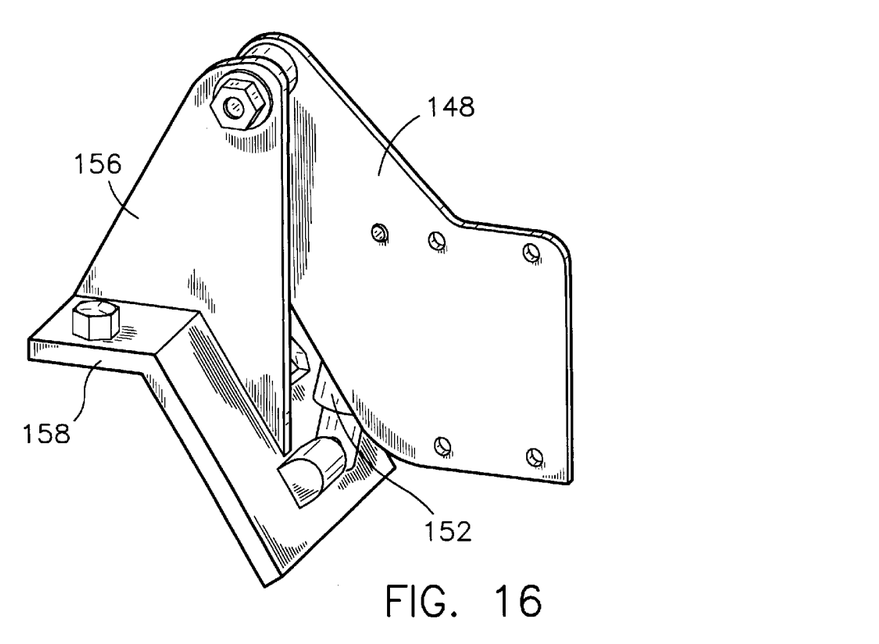
FIG. 16 is a second type of anchor bracket comprised in a tilt-up attachment kit for supporting the seat suspension system.

Referring now to FIG. 16, one can appreciate that numerous mounting brackets may be use for mounting the seat suspension system to a variety of different lift truck frames. For example, the post member may be replaced by a gusset plate 156 and the base member 158 may have various configurations to satisfy different lift truck frames.

Referring now to the swivel base 84 supporting the seat 68 in the seat suspension system according to the preferred embodiment, one feature of this swivel base 84 is illustrated in greater details in FIGS. 17 and 18. The swivel base 84 comprises a lower plate 160 which is affixed to the seat cradle 32, an upper plate 162 to which the seat 68 is mounted and a bearing assembly 164 mounted between the two plates for angular movement of the upper plate relative to the lower plate. There is also provided a rotation limiting mechanism for limiting the rotation of the seat to 30 degrees to the right and 30 degrees to the left as was explained previously. The rotation limiting mechanism comprises a spring-actuated ball-tipped plunger assembly 166 which is affixed to the upper plate 162. The ball tip of the plunger assembly 166 is forced against an arcuate template 168 which is affixed to the lower plate 160. The curved template 168 has three spaced-apart holes 170,172,174 therein disposed at distances from each other for defining respectively a forward position of the seat and two opposite side positions. In use, an operator of the lift truck having the seat suspension system with a swivel base 84 is able to force the seat sideways by twisting it to dislodge the ball-tipped plunger 166 from the central hole 170 and let the seat glide over to one of its side position, where the ball-tipped plunger 166 engages in a corresponding side hole 172,174, to retain the seat in this side position. For this purpose, the plunger assembly has a spring and a set screw for calibration of the spring such that an operator may rotate the seat with more or less ease.

As to additional details related to the manufacturing, installation and operation of the present invention, the same should be apparent from the above description, and accordingly further discussion relative to the manner of making, installing and using the seat suspension system would be considered redundant and is not provided.

While one embodiment of the present invention and two mounting arrangements therefor have been illustrated and described herein above, it will be appreciated by those skilled in the art that various modifications, alternate constructions, alternate mounting arrangements and equivalents may be employed without departing from the true spirit and scope of the invention. Therefore, the above description and illustrations should not be construed as limiting the scope of the invention which is defined by the appended claims.

I claim:

1. A seat suspension system for supporting a seat of an industrial vehicle, said seat suspension system comprising:
    a seat cradle;
    a seat mounted in said seat cradle, said seat having a sitting portion and a backrest portion;
    an anchor body having means for attachment to a frame of said industrial vehicle;
    two pairs of spaced-apart parallel bars; each of said bars having spaced-apart first and second ends, said first ends being movably connected to said anchor body and said second ends being movable connected to said seat cradle for allowing a movement of said seat cradle relative to said anchor body;
    an air bellows having a first end connected to said seat cradle and a second end connected to said anchor body for cushioning said movement of said seat cradle;
    said anchor body having a hollow shape disposed behind said backrest portion of said seat, and said means for attachment to a frame of said industrial vehicle comprising a pair of spaced-apart parallel anchor plates on said anchor body;

such that said anchor body is adaptable for use with various mounting kits for securement thereof to a variety of different models of industrial vehicles.

2. The seat suspension system as claimed in claim 1, wherein said air bellows is enclosed in said anchor body.

3. The seat suspension system as claimed in claim 2, wherein said air bellows has a diameter of about 4.6 inches and a displacement of about 5 inches.

4. The seat suspension system as claimed in claim 1, wherein said two pairs of parallel bars comprise an upper pair of parallel bars and a lower pair of parallel bars, and said bars in said upper pair being rigidly connected to one-another by a torsion rod, for preventing movement of said parallel bars in said upper pair relative to one-another.

5. The seat suspension system as claimed in claim 4, wherein said torsion rod has a diameter of about 7/8 inch, and a distance between said first and second ends of each of said parallel bars is about 5 inches.

6. The seat suspension system as claimed in claim 4, wherein said torsion rod is mounted in a pair of bearing blocks having adjustable connection means retaining said bearing blocks to said anchor body, such that a position of said torsion rod relative to said anchor body and a levelling of said seat cradle are adjustable by working said adjustable connection means.

7. The seat suspension system as claimed in claim 6 wherein said adjustable connection means comprises a pair of levers connected to said bearing blocks and to said anchor body, and a pair of bolts movably retaining said levers to said anchor body.

8. The seat suspension system as claimed in claim 1 wherein said means for attachment to a frame of said industrial vehicle comprises a swing-out attachment kit having means for moving said anchor body and said seat cradle about an axis of rotation aligned substantially perpendicular to a sitting plane of said sitting portion.

9. The seat suspension system as claimed in claim 1, wherein said means for attachment to a frame of said industrial vehicle comprises a tilt-up mounting kit having means for moving said anchor body and said seat cradle about an axis being substantially parallel to a sitting plane of said sitting portion.

10. The seat suspension system as claimed in claim 1, further comprising a swivel mechanism mounted between said sitting portion and said seat cradle, for affording a rotation of said seat relative to said seat cradle.

11. A seat suspension system for supporting a seat of an industrial vehicle, said suspension system comprising:

a seat cradle;

a seat mounted in said seat cradle, said seat having a sitting portion and a backrest portion;

an anchor body having a hollow shape and a pair of parallel spaced-apart anchor plates enclosing said hollow shape, said anchor body being disposed behind said backrest portion of said seat;

said anchor body also having two pairs of spaced-apart parallel bars; each of said bars having spaced-apart first and second ends, said first ends being movably connected to said anchor body and said second ends being movable connected to said seat cradle for allowing a movement of said seat cradle relative to said anchor body;

an air bellows having an upper end connected to said seat cradle and a lower end connected to said anchor body for cushioning said movement of said seat cradle;

said two pairs of parallel bars comprising an upper pair of parallel bars and a lower pair of parallel bars;

said bars in said upper pair being rigidly connected to one-another by a torsion rod for preventing movement of said parallel bars in said upper pair relative to one-another;

said torsion rod being mounted in a pair of bearing blocks having adjustable connection means retaining said bearing blocks to said anchor body; and connection means affixed to said anchor plates for attachment to a frame of said industrial vehicle, said connection means comprising a swing-out attachment kit comprising a hinged connection having an axis of rotation aligned substantially perpendicular to a sitting plane of said sitting portion for allowing said seat cradle and said anchor body to move from a vehicle-driving position to a vehicle-servicing position different from said vehicle-driving position when said swing-out attachment kit is adapted to be mounted to said frame of said industrial vehicle;

such that a position of said torsion rod relative to said anchor body, and a levelling of said seat cradle are adjustable by working said adjustable connection means, and said seat cradle and said anchor body being simultaneously movable about said axis of rotation.

12. The seat suspension system as claimed in claim 11, wherein said swing-out attachment kit comprises latching means for selectively allowing said anchor body and said seat cradle to move about said hinge connection.

13. The seat suspension system as claimed in claim 12, wherein said hinged connection has a rotational range of about 180 degrees.

14. The seat suspension system as claimed in claim 12, wherein said latching means comprises a latch bracket having means for connection to said frame of said industrial vehicle and a latch plate connected to one of said anchor plates, said latch plate having engagement means for releasable connection thereof to said latch bracket.

15. The seat suspension system as claimed in claim 14, wherein said engagement means is a pair of stub shafts extending from said latch plate, and said latch bracket has a pair of sockets, and said stub shafts have dimensions and spacing for engagement in said sockets.

16. The seat suspension system as claimed in claim 15, wherein said stub shafts each has a diameter of about 7/8 inch, and a spacing between said stub shafts is about 5 inches.

17. The seat suspension system as claimed in claim 11, further comprising a swivel mechanism mounted between said sitting portion and said seat cradle.

18. The seat suspension system as claimed in claim 17, wherein said swivel mechanism comprises rotation limiting means having a range of 60 degrees.

19. The seat suspension system as claimed in claim 18, wherein said rotation limiting means is a spring-loaded ball-tipped plunger moving against an arcuate template, and said template has holes therein at locations corresponding to a first, second and third angular positions of said seat for restrictively retaining said seat in one of said angular positions relative to said seat cradle.

* * * * *